Dec. 29, 1964  V. J. LUNDELL  3,163,131
FLUID SUPPLYING ARRANGEMENT FOR WAFERING MACHINES
Filed Aug. 31, 1962  2 Sheets-Sheet 1

INVENTOR.
VERNON J. LUNDELL
BY Wolfe, Hubbard,
Voit & Osann
ATTORNEYS.

Dec. 29, 1964 V. J. LUNDELL 3,163,131
FLUID SUPPLYING ARRANGEMENT FOR WAFERING MACHINES
Filed Aug. 31, 1962 2 Sheets-Sheet 2

INVENTOR.
VERNON J. LUNDELL
BY Wolfe, Hubbard,
Voit & Osann
ATTORNEYS.

United States Patent Office 3,163,131
Patented Dec. 29, 1964

3,163,131
FLUID SUPPLYING ARRANGEMENT FOR WAFERING MACHINES
Vernon J. Lundell, Cherokee, Iowa, assignor to Massey-Ferguson Services N.V., Curacao, Netherlands Antilles, a corporation of the Netherlands Antilles
Filed Aug. 31, 1962, Ser. No. 220,789
3 Claims. (Cl. 107—14)

This invention relates generally to agricultural crop treating machines and more particularly concerns a fluid supplying arrangement for such machines.

Forage crops such as hay have traditionally been gathered into bales for convenience in handling and storage. Recently, however, practical wafering machines have come into use which form forage crop material into compacted wafers or pellets, a system having substantial advantages over the traditional baling technique.

A modern wafering machine is a mobile agricultural implement designed to be maneuvered by a tractor and capable of picking up the harvested and dried crop material, reducing the material to a homogeneous mass, and pressing the mass into the desired wafers or pellets. The product is dumped into a wagon for transport to a storage point and, as with other harvesting devices, a single wafering machine can be kept in virtually continuous operation by using a number of wagons running between a storage point and the operating machine.

As an incident to the wafering operation, it is desirable to add water to the crop material mass to achieve a proper wafer moisture content, and often an auxiliary nutrient in fluid form, such as molasses, is added with the water to the wafer forming crop material. A wafering machine must thus be serviced with a supply of fluid if it is to operate "continuously," i.e., for long periods.

The present invention lies in providing and operatively coupling a wafer receiving wagon having an auxiliary fluid tank to a wafering machine so that the fluid in the auxiliary tank can be used in processing the wafers received by the tank, and the tank refilled when emptying the wagon, so as to allow virtually continuous operation of the wafering machine.

Figure 1:
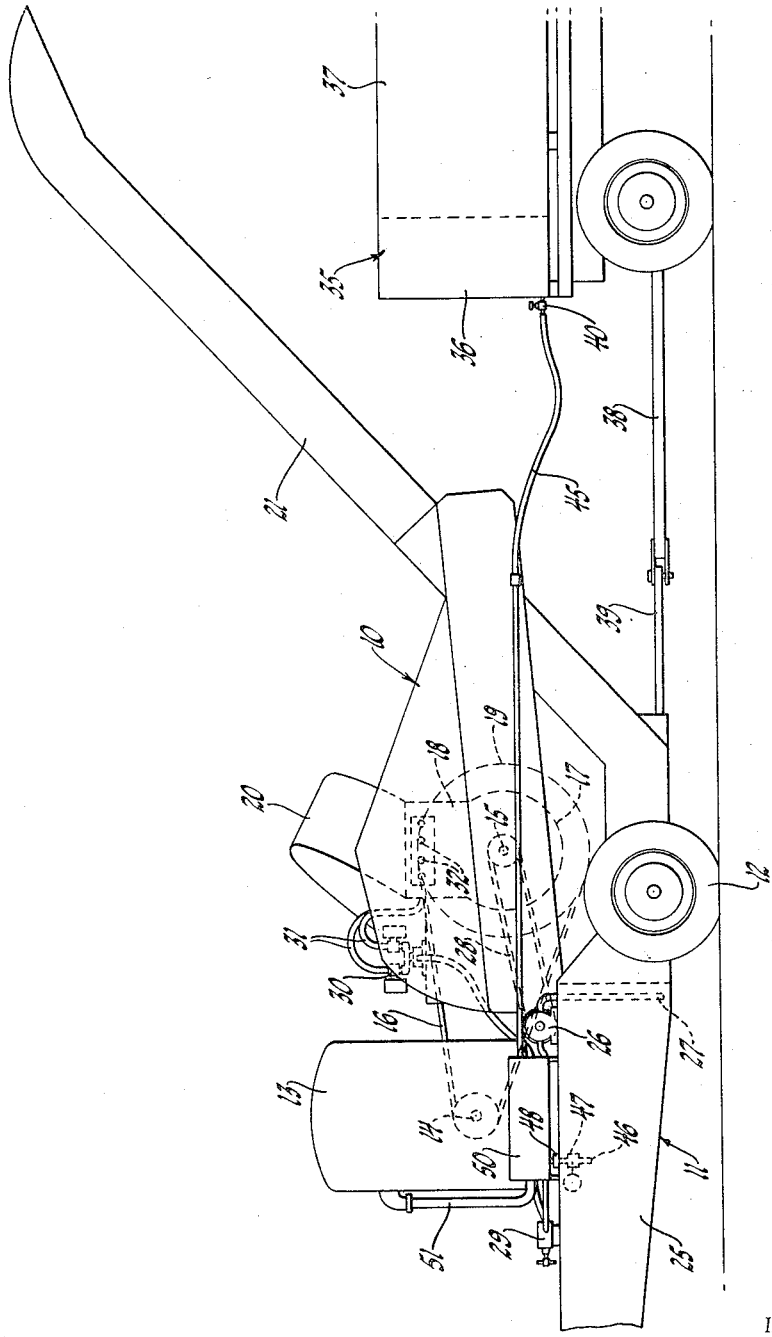
Figure 2:
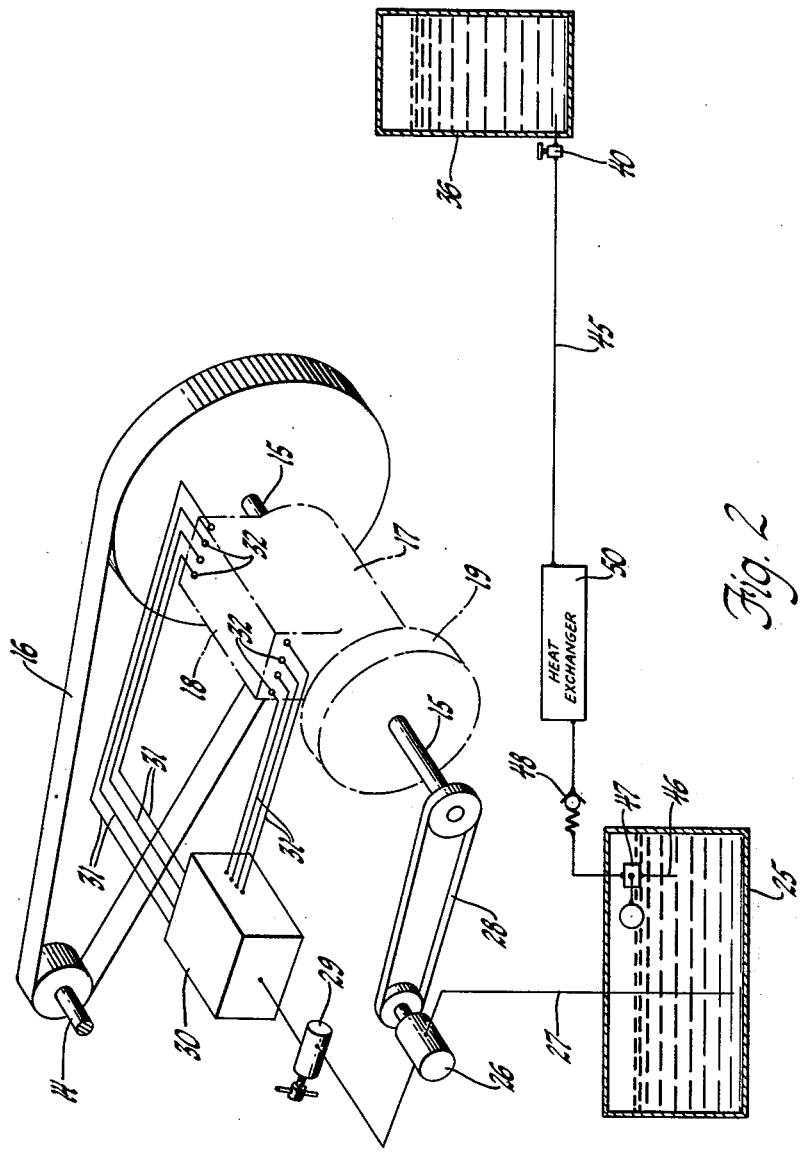

An example of the inventive fluid supplying arrangement is shown in the accompanying drawings, in which:

FIGURE 1 is a fragmentary elevation of a wafering machine and attached wagon embodying the present invention; and FIG. 2 is a schematic representation of the fluid supply system embodied in the machine and wagon shown in FIG. 1.

While the invention will be described in connection with a preferred embodiment, it will be understood that I do not intend to limit the invention to that embodiment. On the contrary, I intend to cover all alternatives, modifications and equivalents as may be included within the spirit and scope of the invention as defined by the appended claims.

Turning now to FIG. 1, there is fragmentarily shown a wafering machine 10 whose frame 11 is hitched at its forward portion to a tractor, not shown, and is supported at its rear by ground-engaging wheels 12 of which only one is shown. The wafering machine 10 is preferably of the type shown in my co-pending application Serial No. 153,599, filed November 20, 1961, and includes an internal combustion engine power plant 13 having an output shaft 14 coupled to a drive shaft 15 through a multiple belt drive 16 (see also FIG. 2). The drive shaft 15 passes through a cross feed conveyor chamber 17, positioned beneath a hopper 18, and a wafering mechanism 19. Crop material is fed to the hopper 18 through a crossover hood 20 from a pickup and chopping mechanism positioned on the opposite side of the machine 10 as seen in FIG. 1 and therefore not shown herein. The crop material falls through the hopper 18 into the chamber 17 whereupon it is driven to the wafering mechanism 19 which forms the crop material into pellets or wafers that are thereafter carried rearwardly and upwardly by a discharge elevator 21.

In order to moisten the crop material being formed into wafers, the machine 10 is provided with a fluid system including a supply tank 25, formed as an integral portion of the frame 11, from which fluid is drawn by a pump 26 through a suction line 27. The pump 26 is driven by a belt 28 from the drive shaft 15 and fluid is delivered from the pump through a flow control valve 29 to a manifolding assembly 30 which pulses measured quantities of fluid through lines 31 to respective ones of a plurality of nozzles 32 opening into the hopper 18. The moisture of fluid contained in the tank 25, which may be water or water plus an additional nutrient such as molasses, is thus discharged from the nozzles 32 into the mass of crop material as the material falls through the hopper 18 into the conveyor chamber 17 on its way to the wafering mechanism 19. The mechanisms and arrangements so far described are quite fully discussed in the application identified above.

Pursuant to the invention, a wagon 35 having an auxiliary fluid tank 36 is operatively coupled to the wafering machine 10 to receive the wafers from the discharge elevator 21 and to supply fluid to the fluid system of the machine. The wagon 35 includes an open topped body 37 having a wagon tongue 38 that is releasably coupled to a hitch bar 39 attached to the wafering machine frame 11 so that the wagon trails behind the machine 10 with the body 37 positioned to receive wafers discharged from the elevator 21. Preferably, the forward portion of the wagon body 37 defines the auxiliary tank 36 which includes any convenient type of filling opening and is provided with a shut-off valve 40 at its bottom.

The auxiliary fluid tank 36 is coupled by a releasable fluid carrying connection to the supply tank 25. In the preferred embodiment, the connection includes a flexible hose 45 which is frictionally engaged over the output pipe of the valve 40 and which leads to a discharge nozzle 46 in the supply tank 25. The auxiliary tank 36 is disposed at a higher elevation than the supply tank 25 when the wafering machine 10 and the wagon 35 are on generally horizontal ground, and a level control float valve 47 is disposed adjacent the discharge nozzle 46 to meter the flow of fluid which is impelled from the auxiliary tank 36 to the supply tank 25 under the force of gravity. The effect of this arrangement is to keep the supply tank 25 filled to the point where the float valve 47 shuts off. As soon as fluid is drawn from the supply tank 25, the float valve 47 opens and additional fluid is added from the auxiliary tank 36.

A simple check valve 48 is interposed between the hose 45 and the level control valve 47 so that fluid cannot flow in what would be a reverse direction from the supply tank 25 to the auxiliary tank 36 when the wafering machine 10 and the wagon 35 are placed on uneven ground, as when being drawn up a hill.

To heat the fluid, a heat exchanger 50 is provided in the fluid system of the wafering machine 10 so as to draw heat from the power plant 13 and add the heat to the fluid utilized by the fluid system. In the illustrated embodiment, the exhaust of the power plant 13 is directed by a pipe 51 to the heat exchanger 50, and the exchanger is placed between the supply tank 25 and the auxiliary tank 36. The exhaust heat from the power plant 13 warms the fluid that is being added from the auxiliary tank 36 to the fluid system of the wafering machine.

Preferably, the auxiliary tank 36 is proportioned to contain enough fluid to treat a wagon load of wafers. As observed above, the fluid can consist entirely of water or of water containing an added nutrient material. By thus arranging the capacities of the auxiliary tank 36 and the wagon body 37, the auxiliary tank 36 can be refilled with fluid as an incident to unloading the wagon at the wafer storage point and returning the wagon to the wafering machine. In this way, two or more wagons can keep a single wafering machine in virtually continuous operation.

The embodiments of the invention in which an exclusive property or privilege is claimed are defined as follows:

1. The combination of a mobile forage crop wafering machine having a fluid system including a supply tank for adding fluid to the crop material wafers being formed by the machine and a wagon for receiving the wafers from said machine, said wagon having an auxiliary fluid tank disposed at a higher elevation than said supply tank, a releasable fluid conveying connection between said auxiliary tank and said fluid system to supply fluid thereto, said connection including a level control valve for metering fluid from said auxiliary tank to said supply tank.

2. The combination of claim 1 including further a heat exchanger for heating said fluid added to the crop material, and said wafering machine having a power plant from which heat is directed to said heat exchanger.

3. The combination of claim 1 in which said connection also includes a check valve for preventing fluid flow from said supply tank toward said auxiliary tank.

References Cited in the file of this patent

UNITED STATES PATENTS

| | | |
|---|---|---|
| 811,060 | Hamann | Jan. 30, 1906 |
| 1,487,394 | Lorenz | Mar. 18, 1924 |
| 1,945,429 | Fowler | Jan. 30, 1934 |
| 2,268,979 | Williamson et al. | Jan. 6, 1942 |
| 3,049,145 | Kmiecik et al. | Aug. 14, 1962 |
| 3,070,002 | Mathews | Dec. 25, 1962 |
| 3,084,620 | Gibbons | Apr. 9, 1963 |

OTHER REFERENCES

Western Livestock Journal (pages 36 and 39), Apr. 17, 1961.